Sept. 8, 1931. C. BIRDSEYE 1,822,077
REFRIGERATING APPARATUS
Filed Feb. 6, 1929 6 Sheets-Sheet 1

Fig. 1.

Inventor
Clarence Birdseye
by H.W.Henney, atty.

Sept. 8, 1931.   C. BIRDSEYE   1,822,077
REFRIGERATING APPARATUS
Filed Feb. 6, 1929   6 Sheets-Sheet 2

Sept. 8, 1931.  C. BIRDSEYE  1,822,077
REFRIGERATING APPARATUS
Filed Feb. 6, 1929   6 Sheets-Sheet 6

Inventor
Clarence Birdseye
by H.W.T.Kinney atty.

Patented Sept. 8, 1931

1,822,077

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

REFRIGERATING APPARATUS

Application filed February 6, 1929. Serial No. 337,858.

This invention relates to refrigerating apparatus of the type used for quick freezing or chilling articles of all sorts but useful particularly as applied to the refrigeration of food products.

In one aspect my invention consists in apparatus having a plurality of heat-conductive members arranged to refrigerate different articles, or separate series of continuously presented products, in which the several heat-conductive members are all cooled by a unitary system supplying a liquid cooling medium to all of them. From this standpoint the present invention consists in a development or carrying-forward of the principles disclosed in my prior Letters Patent of the United States No. 1,773,081, granted August 12, 1930, in which I have shown apparatus having a single article-enveloping conveyor of heat-conductive material cooled by the application of a liquid cooling medium. As distinguished from that construction and as an example of one embodiment of the present invention, I now contemplate employing several such conveyors cooled by brine or other liquid medium directed against them by the operation of a unitary system of circulation and distribution. I have thus succeeded in producing apparatus having greatly increased capacity and improved efficiency of operation without necessitating a corresponding increase in the capacity of its circulating system.

In another aspect my invention consists broadly in a multiple stage refrigerating apparatus, that is to say, apparatus in which the cooling medium is used in consecutive stages, serving first to cool one set of heat-conductive members and being then transferred to act upon another or other sets of heat-conductive members. I have discovered that in quick-freezing food products between conductive members the same refrigerated brine may be used to chill two or more sets of conductive members consecutively or in series without substantial intermediate rise in temperature, so that approximately the same rate and efficiency may be maintained in the consecutive refrigerating operations. Accordingly, refrigerating apparatus constructed so as to take advantage of this principle may be operated with a higher degree of economy than heretofore.

In this connection, another feature of the invention consists in a multiple stage refrigerating apparatus in which the various sets of conductive members are arranged one above another so that liquid cooling medium may be caused to flow by gravity from one set to another, acting consecutively or in series upon them. This arrangement is advantageous in that it facilitates a compact design of the apparatus and obviates the necessity of recirculating pumps interposed between the stages thereof.

More specific features of my invention relate to improvements in refrigerating apparatus employing metallic belts or bands for its conductive members and consist in various features of construction by which the bands may be more efficiently driven and more accurately controlled than heretofore. Improved means are also disclosed for securing the desired intimate contact of the bands with the article to be frozen.

Where one band is arranged above another and refrigerated by a liquid cooling medium such as brine, it is desirable to prevent the brine from dripping from the upper band upon the articles beneath it. I have found that this may be prevented by deflecting the marginal edge of the band downwardly so as to direct the brine away from the articles. Another feature of my invention, therefore, consists in a metallic band guided to travel in the plane of its surface and having its marginal edge deflected out of said plane. This may be effected in any desired manner, either temporarily throughout a portion of the path of the band or by shaping the band permanently in such condition.

In refrigerating apparatus of the type to which this invention relates, the accumulation of a certain amount of frost upon the surfaces of the cooled heat-conductive members is inevitable. This not only acts as an insulation to the flow of heat from the article being refrigerated but constitutes a mechanical obstruction to the operation of the apparatus. Another feature of my invention, accordingly, consists broadly in means for removing accumulated frost from the article-engaging surface of a heat-conductive member employed for refrigerating an article or product. In apparatus of the character herein shown, where the heat-conductive members comprise endless metallic bands, the accumulated frost may be successfully removed by temporarily warming a section of the band to loosen the frost and then remove it mechanically at this point and before that particular section of the band comes again into active operation. In this way a clean and fully efficient heat-conductive member is insured at the point of presentation of the article to be refrigerated.

These and other features of the invention will be best understood and appreciated from the following description of a preferred embodiment thereof, selected for purposes of illustration and shown in the accompanying drawings, in which.

The apparatus herein illustrated comprises two complete units, each including an article-enveloping heat-conductive conveyor. The units are arranged one above another and the conveyors in both units are refrigerated by the same system for circulating liquid cooling medium. A medium which answers all requirements is calcium chloride brine of about 33° Baumé maintained at an average temperature of 45° below zero F. and supplied to the bands at the rate of about 200 gallons per minute. Of course, these figures can be widely varied according to the circumstances and alcohol or other freezing mediums can be used but, for convenience in the following description and claims, the medium will be referred to in a generic sense merely as brine.

The frame 10 of the apparatus is built up in sections of convenient length of standard structural shapes, timber and insulating material, and comprises two structural steel end sections in which the drums for the conveyor bands are journaled, connected to an insulated intermediate section containing the refrigerating chambers and part of the brine circulating system.

Figure 1:
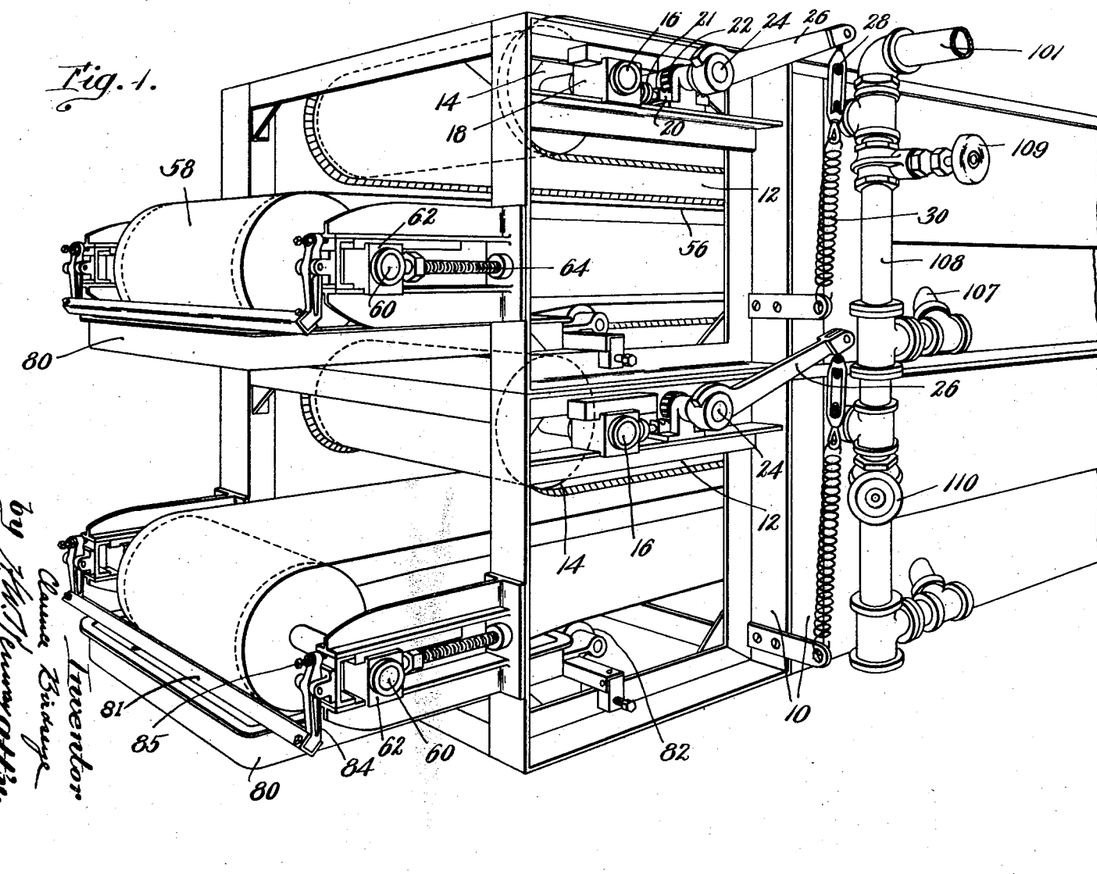
Fig. 1 is a view in perspective of the apparatus seen from the receiving end.

The two units are identical insofar as the mounting of the conveyor drums is concerned. The conveyor bands are of thin heat-conductive material, preferably of nichrome steel about 0.0312" thick. The upper band of each pair is arranged to run over a driven drum 32 at one end and an idle drum 14 at the other. The drum 14 is fast on a shaft 16 journaled in a sliding block 18 arranged for movement longitudinally in ways formed in the frame. Adjustably secured to each journal block 18 by a screw 21 is a horizontally disposed rack 20. Meshing with the rack 20 is a pinion 22 fast on a transverse shaft 24 which is mounted in stationary bearings in the frame. At its outer end the shaft 24 is connected to an arm 26, to the free end of which is connected a tension spring 30 through an adjustable turn buckle 28. The spring 30 is secured at its lower end to a stationary bracket projecting from the frame and tends always to swing the arm 26 in a clockwise direction, as seen in Fig. 1, and to move the blocks 18 and the drum 14 yieldingly toward the left or in a direction to take up any slack occurring in the band 12 and maintain it under uniform tension.

At its driven end, the band 12 passes about a drum 32 secured to a transverse shaft 35 journaled in stationary but adjustable bearings carried by the frame 10. A stop screw 36 determines the position of each bearing of the shaft 35 and by means of these the shaft may be adjusted angularly and brought into alignment so that the band 12 will run true. The shaft 35 carries a large sprocket wheel 38 driven by a sprocket chain 39 from a short countershaft 40 journaled in the frame. The countershaft 40 carries a spur gear 111 meshing with a spur gear 112 on a transverse shaft 44 journaled in the end of the frame. A second spur gear 115 on the shaft 44 meshes with a gear 114, which is a part of a gear reduction unit directly connected to a motor 42 mounted in the frame. A sprocket wheel 46 is fast with the gear 112 on the shaft 44 and through a sprocket chain 46, drives a large sprocket wheel 54 on the shaft 52 of the driving drum 50 for the lower band of the conveyor. The transverse shaft 52 is journaled in bearings upon the frame 10, which are normally stationary but may be angularly adjusted by stop screws 51.

The lower band 56 passes about the driving drum 50 at one end and about an idle drum 58 at the other. The drum 58 is carried by a shaft 60 journaled in sliding blocks 62, guided in ways secured to the frame, and adapted to be positioned and aligned by adjusting screws 64 which extend between the blocks 62 and a stationary threaded boss on the frame. It will be noted that the drum 58 is not free for yielding movement as in the case of the drum 14 but that it is adjusted and positively maintained in adjusted position by the construction of its bearings and the adjusting screws 64. The drum 58 is located considerably beyond the drum 14 so that the upper surface of the band 56 may conveniently serve to receive the articles to be refrigerated. These, it will be understood, are placed upon the band 56 and carried inwardly by it until engaged by the lower pass of the upper band 12.

The intermediate portion of the frame is occupied by elongated refrigerating chambers, through which the adjacent passes of the conveyor bands travel and in which the refrigeration of the articles is effected. Each refrigerating chamber is surrounded by longitudinal walls of insulating material 70 and suitable openings are provided at opposite ends for the passage of the conveyor bands. The upper pass of the lower band 56 is supported vertically throughout its length within the refrigerating chamber by a series of rollers 72 journaled at either end in a stationary frame 74 and constituting collectively an anti-friction support for the band. Between each roller 72 is located a perforated transversely-extending brine pipe 76. Each of the pipes 76 has a central downwardly-extending connection to a longitudinally disposed feed pipe 78. Brine supplied under pressure by the feed pipe 78 is sprayed upwardly and divergently from perforations in the transverse pipe 76 against the under side of the band 56. Thus the band traveling longitudinally passes through a series of parallel closely-spaced transverse zones of refrigerated spray so that complete and uniform refrigeration of the heat-conductive band is insured.

Adjacent to the idle drum 58 of each of the lower bands 56 is disposed a shallow tank or pan 80 which may contain relatively warm brine and alcohol or other cleansing and sterilizing fluid. The band 56 is guided over the inner edge of the pan 80 by an idle roll 82 and is directed beneath the level of the liquid contained in the tank as it passes about the lower side of the drum 58. A brush or mat 83, conforming substantially to the curvature of the band and pressing against it, is secured to the pan 80 by a bracket, not shown. A length of rubber hose or other flexible material suitable for a wiper is carried by a cross bar 81 extending between the lower ends of a pair of arms 84 mounted between ears on a bracket or angle plate associated with the bearing blocks 62 of the drum shaft 60. Each arm 84 carries an adjusting screw 85 at its upper end by which the cross bar 81 may be adjusted with respect to the drum, and pressure of the wiper upon the band 56 regulated. This treatment of the band serves to remove accumulated frost as well as waste or dirt which may have reached the band and to insure that a clean surface is presented to receive the articles to be refrigerated.

Figure 2:
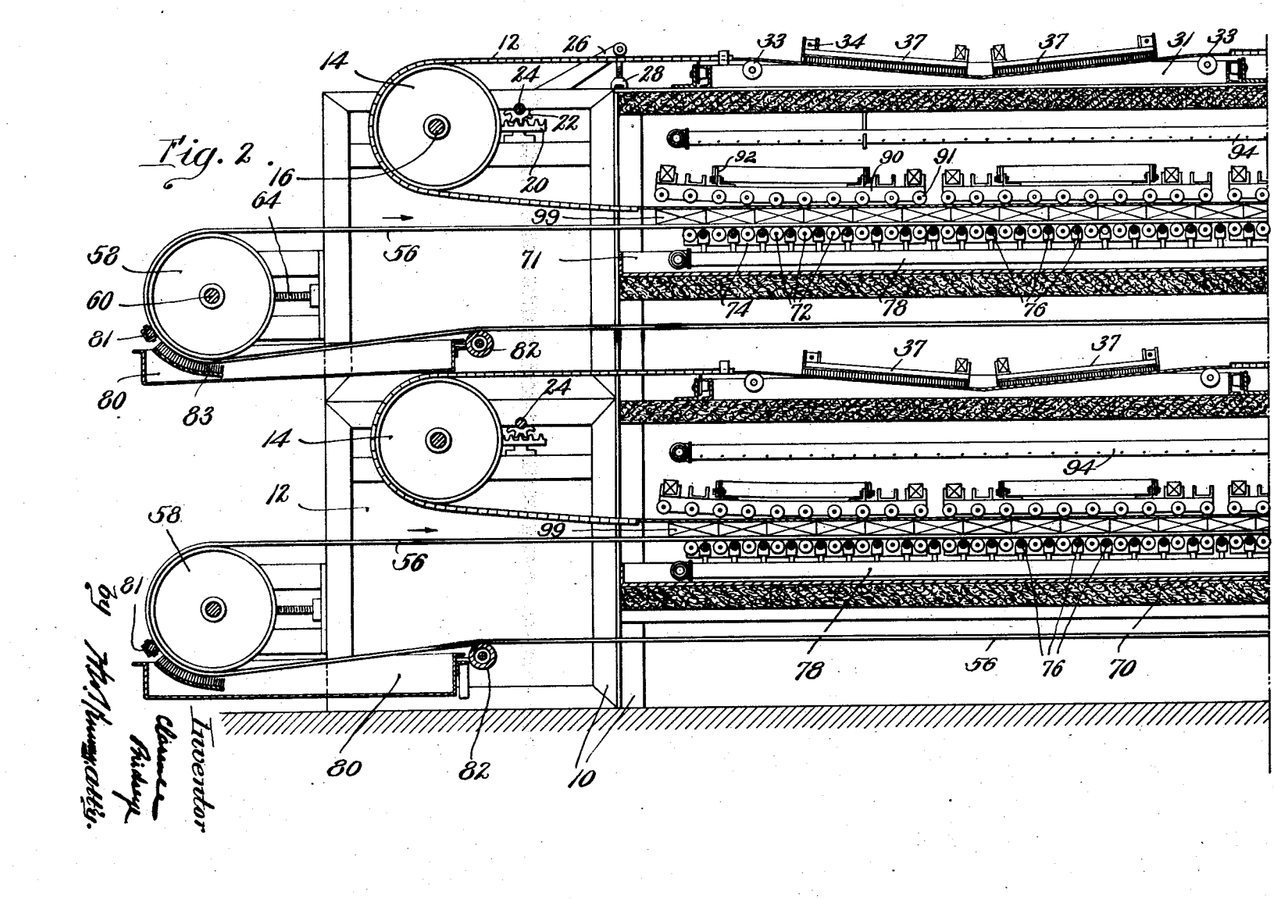
Fig. 2 is a view in horizontal section of the receiving end of the apparatus.

While the lower band 56 is arranged to travel in a predetermined horizontal path and maintained in such by its supporting rollers, the upper band 56 is arranged to accommodate itself automatically to the thickness of the article or articles presented to the conveyor. The lower pass of the band 12 is, therefore, weighted to cause it to sag into contact with the articles on the lower band 56. To this end, a series of independent frames 90, having transverse rollers 91 therein, are disposed upon this portion of the band 12. Each frame 90 is provided with an outwardly-extending frame 92 suitably braced for stiffness and each having a downwardly-extending pin loosely mounted in a stationary bracket 93 secured to the inner wall of the refrigerating chamber. Each frame 92 is pivotally fastened to a frame 90 at its forward end by means of bolts which permit the frames to swivel. Each frame 90 is, therefore, anchored against transverse or longitudinal movement but is free to rise and fall with the band 12. The rollers 91 are spaced from each other and constitute an anti-friction bearing for the frame upon the band. Each frame is suitably weighted so that together they overbalance the tension in the band caused by the springs 30 and produce a pressure on the articles between the two bands. The endmost frames, as shown in Fig. 2, are curved upwardly at the end adjacent to the drums 14 and 32 so that the sagging band will not be bent too sharply. Brine is supplied to the band 12 by two longitudinally-extending feed pipes 94 disposed in the upper part of the refrigerating chamber above the frames 90 and with their perforations so disposed as to deliver the brine in jets located substantially between the rollers 91.

A long shallow tank 31 is located upon the top of the frame 10 just beneath the upper band 12 and provided with rollers 33 near either end to guide the band over the ends of the tank. A similar tank is correspondingly located with respect to the upper band of the lower unit. These tanks, like the tanks 80, may contain cleaning and sterilizing fluid. A pair of weighted mats or brushes 37 are pivotally mounted upon transverse shafts 34 so as to cause the portion of the bands between the guide rollers 33 to be deflected below the surface of the fluid in the tanks 31. The article-engaging surface of the upper band 12 is thus progressively cleaned of frost and accumulated waste before reaching the receiving end of the apparatus.

The upper band 12 of each conveyor is wider than the lower band 56 with which it is associated and is symmetrically disposed with respect to it. As already intimated, it is important to prevent the brine delivered upon the upper surface of the band 12 from running inwardly from the edge thereof and so reaching the articles being refrigerated. To prevent this, both edges of the upper band are permanently deflected so as to shed the brine beyond the edges of the narrower band 56. In the lower pass of the band 12, therefore, its edges are deflectd downwardly and outwardly at an angle of approximately 45°.

Figure 7:
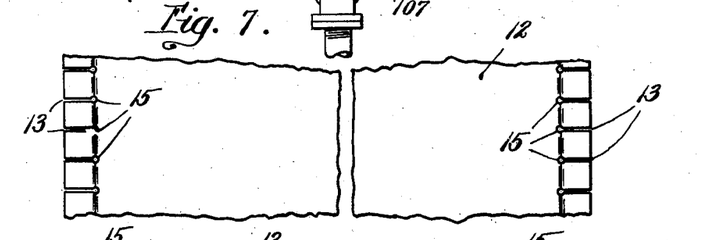
Fig. 7 is a plan view on a larger scale of a portion of one of the upper conveyor bands.
Figure 8:
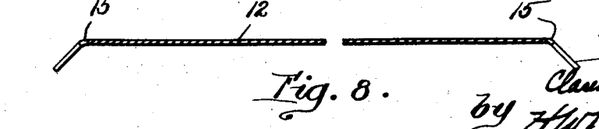
Fig. 8 is a view in cross section of the band.

It will be apparent that a severe strain is imposed upon a metallic band with deflected edges due to the continual flexing to which it is subjected in passing about its supporting drums. This is obviated and the life of the band correspondingly increased, as herein shown, by forming in the deflected edges of the band 12 a series of short transverse slits, preferably in the form of slots 13, of appreciable width. These permit the edge to be elongated when the band is curved in a convex sense and to contract when the band is curved in a concave sense. The space between the sides of the slots permits contraction to take place without any wedging action of the material between the slots. In order to distribute the residual strain and prevent any tendency to crack at the base of the slots, the band is first perforated and each slot 13 cut into a perforation 15 of greater diameter than the width of the slot. The line of edge deflection extends substantially through the perforations 15. The surface tension of the brine flowing upon the upper surface of the band is sufficient to prevent any of it from passing through the perforations 15 or the slots 13, so that it reaches the marginal edges of the band 12 and falls beyond the edges of the lower band 56 without entering into the space between the bands.

The conveyor band having the characteristic features above set forth is not claimed herein but forms the subject matter of my divisional application Serial No. 417,694, filed December 31, 1929.

It has been explained how the brine is directly supplied upon the upper surface of the band 12 by the two longitudinal pipes 94 and to the lower surface of the band 56 by the transverse pipes 76 and the feed pipe 78. These pipes comprise part of the circulating system which will now be more fully described.

Figure 4:
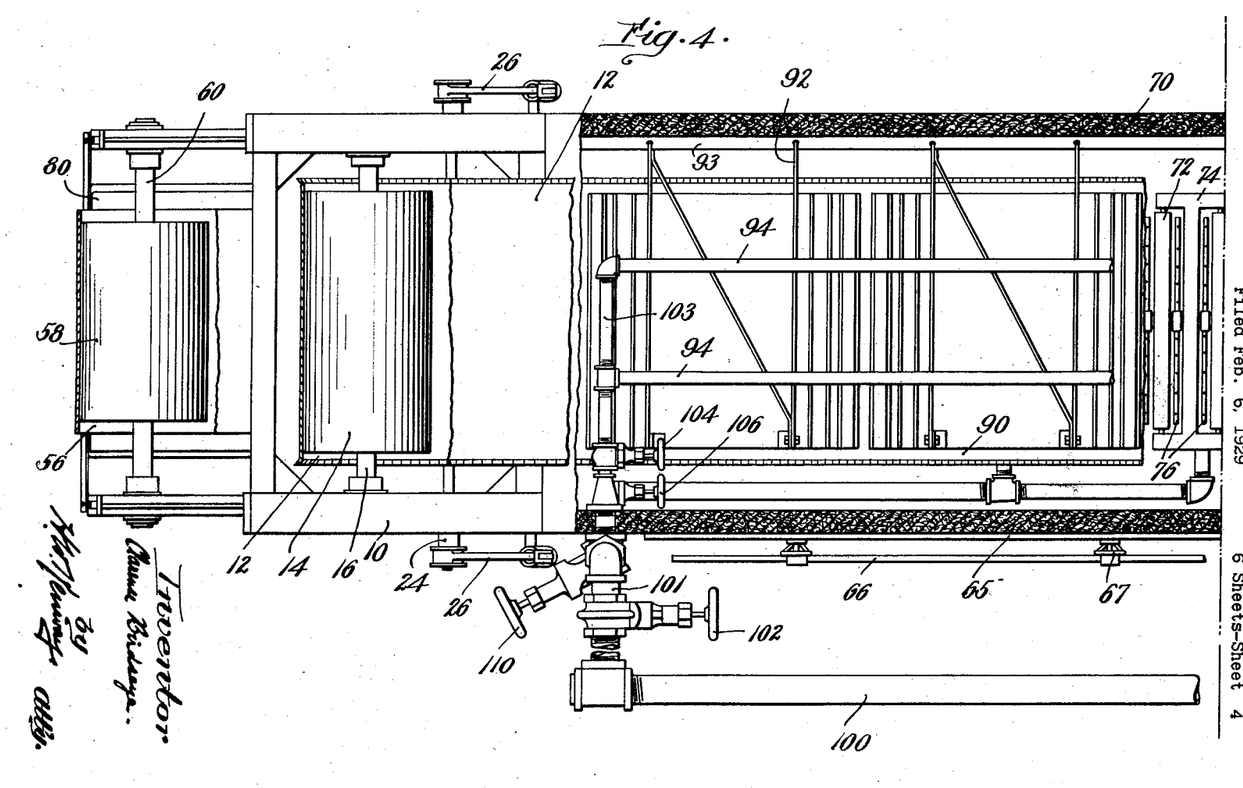
Fig. 4 is a plan view, partly in section, of the receiving end of the apparatus.
Figure 5:
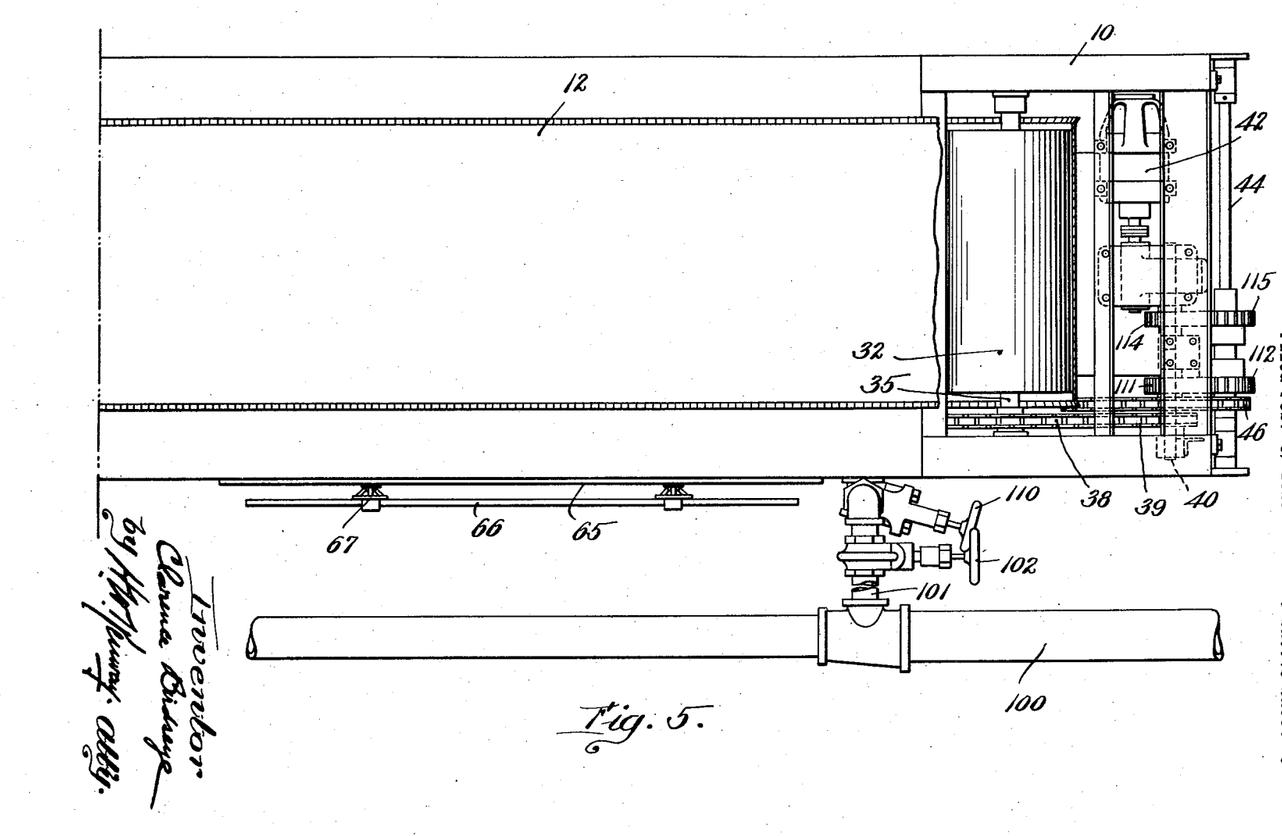
Fig. 5 is a plan view, with certain parts broken away, of the delivery end of the apparatus.
Figure 6:
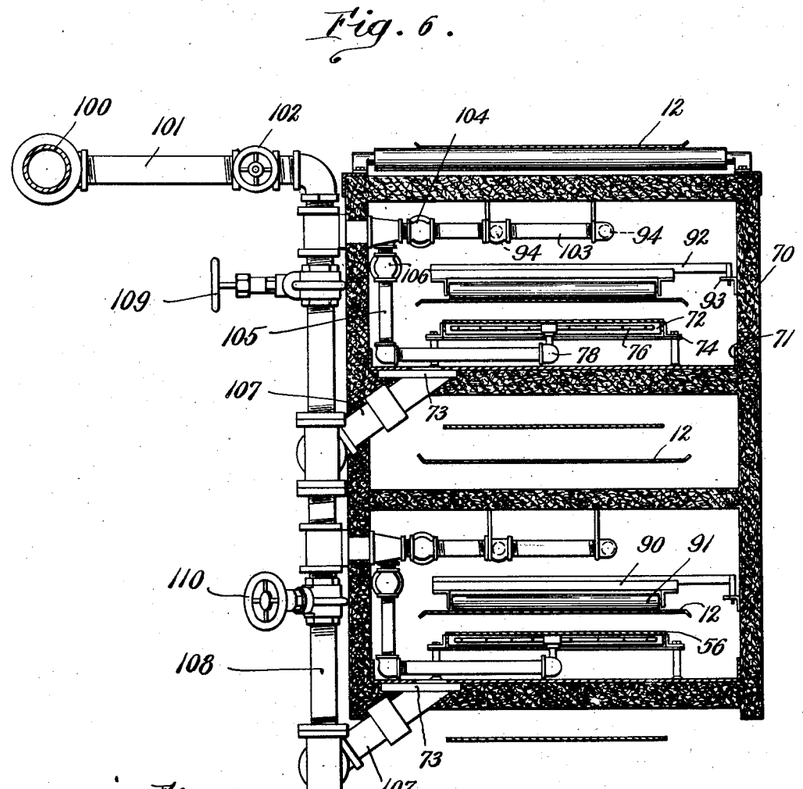
Fig. 6 is a view in cross section of the apparatus.

Cold brine is supplied to the apparatus by a main header 100 located substantially at the level of the top of the apparatus and extending longitudinally thereof. Opposite the end of each refrigerating chamber a branch header 101, provided with a valve 102, extends toward the apparatus and is led downwardly at the wall thereof. A horizontal branch 103 extends inwardly through the wall of each of the upper refrigerating chambers and communicates with the two longitudinal pipes 94, as shown in Fig. 4, being provided with a valve 104 for controlling the flow to these pipes. A downwardly-extending connection 105, similarly provided with a valve 106, communicates with the feed pipe 78.

In the bottom of each refrigerating chamber is a tank or pan 71 in which all the brine is collected after flowing from the bands 12 and 56. A trap 73 drains each pan and communicates with an obliquely disposed outlet pipe 107 which leads back to the riser 108 into which the branch header 101 merges. A valve 109 is located in the riser 108 between the inlet branch 103 and the outlet connection 107. By closing this valve the full flow of brine may be directed into the upper refrigerating chamber and according to the extent this valve 109 is opened will the brine be by-passed through the riser. In continuing downward, the riser 108 supplies brine to the lower refrigerating chamber through connections similar to those already described and is provided with a bypass valve 110 for regulating the flow to this chamber.

Figure 3:
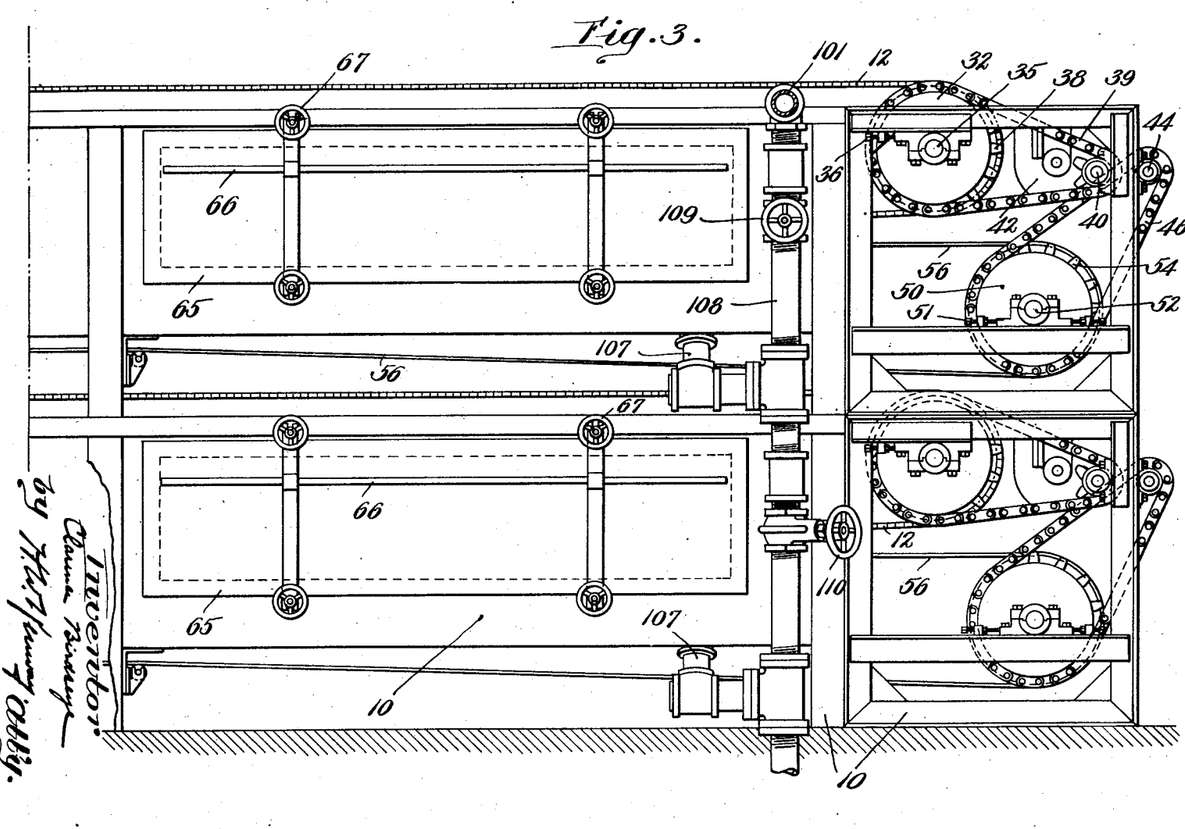
Fig. 3 is a view in side elevation of the delivery end of the apparatus.

Each of the refrigerating chambers has a large opening in its outer wall to afford access to the interior of the apparatus for inspection or other purpose. As shown in Fig. 3, each of these openings is closed by a removable door or shutter 65 having an attached rail 66 to facilitate handling and being held in place by screw clamps 67. It will be understood that the main header 100 supplies two similar risers 108 and that these communicate with the refrigerating chambers adjacent each end thereof. The interior connections are similar in both cases except that the feed pipes extend in opposite directions and in the accompanying drawings the corresponding pipes and valves have been indicated by the same reference characters.

The apparatus is herein shown as being used for freezing a packaged food product, such as dressed fresh fish, whereby the fish is quick frozen in the package in which it is to be marketed. The package preferably comprises a cardboard carton 99, waxed or otherwise rendered resistant to the absorption of moisture. The cartons are completely filled to insure intimacy of contact between the various layers of the fish and between the container and the fish and a minimum of air pockets, so that there may be uniform and rapid heat transference throughout the mass and outward through the carton. The cartons 99 are delivered to the lower conveyor band 56 at the receiving end of the machine and advanced by the band into the refrigerated zone between it and the upper band 12, arranged closely side by side and end to end, and are carried into the refrigerating chamber in this condition. The speed of the conveyor may be adjusted to move the cartons through the refrigerating chamber in the length of time necessary for freezing or the cartons may be advanced into the chamber by the bands and conveyor then stopped, retaining the cartons in the chamber for the desired length of time and then put in motion to deliver the cartons from the apparatus.

In the operation of quick freezing the filled cartons, a continuous supply of brine is delivered through the branch headers 101 to the longitudinal pipes 94 and the feed pipes 78 and the bands of the conveyor refrigerated, as already explained. The heat absorbed from the cartons in this operation raises the temperature of the brine slightly but, in practice, the rise in temperature has been found negligible and the brine which has been used in one refrigerating chamber may be successfully used in another or other refrigerating chambers for the same function. The used brine collected in the pan 71 of the uppermost refrigerating chamber now flows by gravity through the outlet pipe 107 back to the riser 108 and then to the longitudinal pipes 94 and the feed pipes 78 of the refrigerating chamber located beneath it. In this step the brine flows under a pressure head of several feet, which is sufficient to cause it to spray through the perforations of the transverse pipes 76 which supply brine to the lower surface of the upper pass of the lower band 56, as well as through the pipes 94 which supply brine to the lower pass of the upper band 12. Having served its purpose in the lowermost refrigerating chamber and having again increased slightly in temperature, the brine is returned, through the lower outlet pipe 107 and the riser 108, to a refrigerating machine where it is reduced to its initial temperature in readiness to be recirculated to the system.

It will be apparent that by manipulating the valves provided all of the brine may be caused to flow first to the upper refrigerating chamber and then, in a second stage effect, to the refrigerating chamber beneath it, or a portion of the brine may be by-passed direct to the lower refrigerating chamber or, if desired, the brine may be shut off entirely from either refrigerating chamber and supplied only to the other.

While I have referred particularly to the application of the apparatus to the refrigeration of packaged food products, this is by way of example only, for the apparatus may be employed with advantage to effect any desired heat-interchanging process involving refrigeration either primarily or secondarily. Again, I have referred to fresh fish as an example of one specific food product which may be treated with good results, whereas an even more important field of use for the apparatus disclosed is in the treatment of fresh meat at various stages between slaughtering and dispensing in package form.

Having thus described my invention, what I claim as new and desire to secure by Letters Patent of the United States is:

1. A refrigerating apparatus comprising separate feeding means for presenting different articles to be refrigerated in different refrigerated zones, and a closed continuously operating system of circulation for delivering liquid cooling medium to all of said refrigerated zones.

2. A refrigerating apparatus comprising movable means for presenting simultaneously different articles to be refrigerated in different refrigerated zones, and a system including pipes for conducting liquid cooling medium to and from said refrigerated zones to refrigerate in successive stages the different articles so presented.

3. A refrigerating apparatus comprising a system including pipes for conducting liquid cooling medium to successive refrigerating zones arranged in series, and movable means for presenting separate articles to be refrigerated in said zones, whereby the same cooling medium may act thereon in different stages.

4. A refrigerating apparatus comprising a plurality of pairs of heat-conductive members spaced apart and adapted to engage between them an article to be refrigerated, and means for directing a liquid cooling medium first to one pair of members and then to another pair.

5. A refrigerating apparatus comprising a plurality of pairs of heat-conductive members spaced apart and adapted to engage between them an article to be refrigerated, and a system for continuously directing liquid cooling medium to the various pairs of members in series.

6. A refrigerating apparatus comprising a plurality of pairs of metallic members for engaging opposite sides of an article to be refrigerated, and a system for directing liquid cooling medium to one pair and then flowing the medium to another pair, thereby utilizing the same cooling medium in consecutive stages.

7. A refrigerating apparatus comprising pairs of movable metallic conveyors for engaging articles to be refrigerated, and a system including pipes for directing liquid cooling medium to the conveyors of one pair and then directing the same medium to the conveyors of the second pair, thus cooling the respective pairs in successive stages.

8. A refrigerating apparatus comprising pairs of movable metallic conveyors disposed one above the other and arranged to engage articles to be refrigerated, means for supplying liquid cooling medium to the conveyor of the uppermost pair, and means for collecting said medium after it leaves said pair and directing it into contact with the conveyors of the lowermost pair.

9. A refrigerating apparatus comprising a plurality of metallic belts movable in paths located one above another, means for forcing cold brine in a spray against the uppermost belts, and means for conducting the brine from said uppermost belts and spraying it by gravity against the belts disposed at lower levels.

10. A refrigerating apparatus comprising a plurality of heat-conductive members arranged one above another, means for forcing cold brine to the uppermost of said members, and means for conducting the brine leaving said uppermost members by gravity to those disposed at lower levels.

11. A refrigerating apparatus comprising a plurality of metallic bands disposed in pairs one above another, a system of pipes for supplying liquid cooling medium to the upper and lower surfaces of the uppermost pair, and means for collecting the medium leaving said uppermost pair and leading it to the upper and lower surfaces of a pair located at a lower level.

12. A refrigerating apparatus comprising heat-conductive article-enveloping conveyors movable in paths disposed one above another at substantially the same rate of speed, and a piping system including pipes associated with each conveyor for supplying approximately equal quantities of liquid cooling medium to said conveyors.

13. A refrigerating apparatus comprising heat-conductive article-enveloping conveyors movable in parallel paths, and a unitary piping system including pipes associated with each conveyor for circulating approximately equal quantities of liquid cooling medium to cool the respective conveyors.

14. A refrigerating apparatus comprising a plurality of refrigerating chambers, an article-enveloping conveyor associated with each chamber, and a continuously operating system of circulation for delivering liquid cooling medium within each chamber to its associated conveyor.

15. A refrigerating apparatus comprising a plurality of refrigerating chambers located at different levels and each having an article-enveloping conveyor passing through it, means for forcing liquid cooling medium to the uppermost chamber, and connections for leading said medium by gravity therefrom to a chamber located at a lower level.

16. A refrigerating apparatus comprising movable means for presenting different articles to be refrigerated at different stations, a system of circulation for delivering liquid cooling medium to all of said stations, and means for varying the quantity of cooling medium delivered to the respective stations.

17. A refrigerating apparatus comprising a plurality of refrigerating chambers, a conveyor associated with each chamber, and a system of circulation for delivering cooling medium within each chamber including direct and by-pass connections whereby the quantity of cooling medium delivered to the respective chambers may be varied and governed.

18. A refrigerating apparatus including a pair of superposed endless bands adapted to engage an article to be refrigerated, drums for guiding said bands in adjacent endless paths, and means for causing the upper band to sag between its drums to engage an article upon the lower band.

19. A refrigerating apparatus comprising spaced heat-conductive conveyor bands movable with the articles to be refrigerated between them, and means for automatically adjusting the spacing of the bands in accordance with the dimensions of said articles.

20. A refrigerating apparatus comprising spaced heat-conductive conveyor bands movable with the articles to be refrigerated between them, and means for automatically maintaining a uniform tension on one of said bands regardless of the dimensions of said articles.

21. A refrigerating apparatus comprising upper and lower bands adapted firmly to engage between them articles to be refrigerated, means whereby the lower band is maintained at a uniform level to support said articles and means whereby the upper band is automatically adjusted in its spaced relation to the lower band to the dimensions of said articles.

22. A refrigerating apparatus comprising upper and lower bands adapted firmly to engage between them articles to be refrigerated, means for causing said upper band to sag into contact with articles supported by the lower band, and means for automatically taking up the slack in said upper band.

23. A refrigerating apparatus comprising spaced superposed bands adapted firmly to engage between them articles to be refrigerated, means for causing said upper band to sag into contact with articles supported by the lower band, and spring tension means associated with said upper band and acting to maintain a uniform tension therein regardless of the level at which the band is supported.

24. A refrigerating apparatus comprising spaced superposed bands adapted to engage articles to be refrigerated, the lower band being supported at a predetermined level, and means associated with the upper band and acting to maintain a uniform tension therein while the band is variably supported by articles beneath it, said means comprising weights carried by the upper band and a yielding support for one end thereof.

25. A refrigerating apparatus comprising a pair of heat-conductive conveyor bands arranged to travel in endless paths and to engage between adjacent passes articles to be refrigerated, drums for the uppermost band arranged for relative movement toward each other to permit said band to sag into contact with said articles, and means for automatically taking up the slack in said band when the band is lifted by the articles.

26. A refrigerating apparatus including a heat-conductive conveyor band movable in an endless path in a portion of which it engages the articles to be refrigerated, and means located in another portion of its path for cleaning the article-engaging surface of the band.

27. A refrigerating apparatus including a heat-conductive conveyor band movable longitudinally in a path of varying level, and pressure applying means comprising a frame having a plurality of transverse rollers mounted therein, and an arm pivotally secured to the frame, extending laterally beyond the edge of the band and being so mounted as to anchor the frame against lateral motion while permitting it to rise and fall in parallel relation to the band.

28. A refrigerating apparatus including a heat-conductive conveyor band arranged to run between drums, and pressure applying means comprising a superposed frame curved upwardly at one end to correspond approximately to the sag of the band and having a plurality of rollers mounted therein.

29. A refrigerating apparatus comprising a heat-conductive conveyor band, and means for supplying liquid cooling medium thereto in a series of zones disposed transversely of the band.

30. A refrigerating apparatus comprising a heat-conductive conveyor band arranged for longitudinal movement, a supply pipe disposed in substantially parallel relation thereto, and a series of outlet pipes extending transversely of the band and acting to spray liquid cooling medium against it.

31. A refrigerating apparatus including a heat-conductive conveyor band movable in an endless path having a horizontal article-engaging portion, a cleaning tank located in another portion of said path, and means for guiding the band into said tank.

32. A refrigerating apparatus including a chilled band movable in a predetermined path, a tank for relatively warm liquid, and means for deflecting a portion of the band into said tank.

33. A refrigerating apparatus including a heat-conductive conveyor band movable in an endless path, means for applying liquid cooling medium to said band throughout a portion of its path, and means for warming said band at another point in its path.

34. A refrigerating apparatus including a heat-conductive conveyor band movable in an endless path and adapted to engage an article to be refrigerated, means for chilling the band throughout a portion of its path, and means for mechanically cleaning in another portion of its path the article-engaging face of the band.

35. A refrigerating apparatus comprising separate pairs of heat-conductive members for engaging and pressing between them food products to be refrigerated, and a unitary system of circulation for delivering the same liquid cooling medium to one pair after another in series to absorb heat therefrom in successive stages.

36. Refrigerating apparatus including cooperating conveyor bands arranged to engage the articles to be treated between their adjacent surfaces, and means for delivering a refrigerant to the outer surfaces of the bands, one of said bands having an unsupported area whereby it may sag freely into engagement with the articles under treatment, applying pressure thereto, and automatically adjusting itself to accommodate articles of varying thicknesses.

37. Refrigerating apparatus of the class described, including heat-conductive conveyor bands arranged to engage articles to be treated between their adjacent surfaces, and means for applying a refrigerant to the outer surfaces of the bands, the upper band being supported to sag freely toward the lower band to establish automatically a predetermined pressure upon articles of varying thicknesses and having means whereby, notwithstanding different spacings of the bands due to the automatic accommodation of such articles, the refrigerant is prevented from gaining access to said articles.

38. Refrigerating apparatus of the class described, including heat-conductive conveyor bands arranged to engage articles to be treated between their adjacent surfaces, means for applying a refrigerant to the outer surfaces of the bands, means for supporting the upper band so that it may sag or bend freely into contact with and exert pressure upon the articles being treated, and means for automatically maintaining said band under the desired tension during the operation of the apparatus.

39. Refrigerating apparatus of the class described, including endless heat-conductive conveyor bands arranged one above the other, and means for applying a refrigerant thereto, the upper reach of the lower band being supported from beneath and receiving the articles to be treated and the lower reach of the upper band being caused to sag into contact with said articles as they are fed by the bands.

CLARENCE BIRDSEYE.